Sept. 26, 1933.  J. G. ELKIN  1,927,825
PISTON RING
Filed Dec. 30, 1930
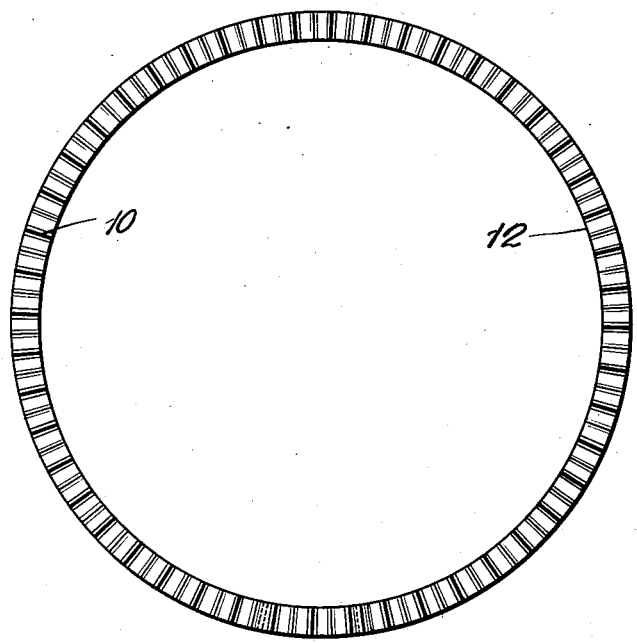
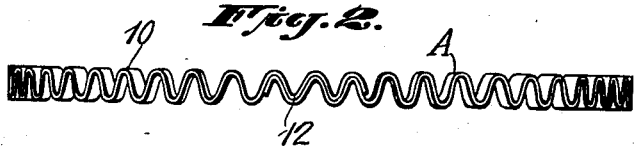
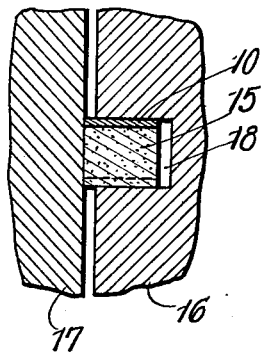
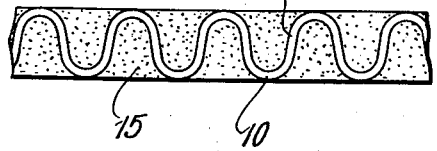
Inventor
JACOB G. ELKIN.
By Perry N. Pattison
Attorney Patented Sept. 26, 1933

1,927,825

UNITED STATES PATENT OFFICE 1,927,825

PISTON RING

Jacob G. Elkin, New York, N. Y.

Application December 30, 1930
Serial No. 505,531

2 Claims. (Cl. 74—109)

This invention relates to improvements in piston rings or packings, and while a piston ring constructed in accordance with the present invention particularly lends itself to use as a packing for pistons of internal combustion engines, it is by no means limited to this use, and is capable of use with equally beneficial results as a packing for steam engine pistons, pump pistons, and in fact in any capacity where packings of this general type are employed.

It is one of the objects of the present invention to provide a piston ring which will inherently conform to irregularities in contour, and surface variations in worn cylinders or other parts with which it has operating contact.

It is a further object of the invention to provide a piston ring which will not require special fitting operations to form a gas tight fit with the walls of a cylinder in which it is used.

It is a further object of the invention so to construct a piston ring that it may be expanded and contracted when being placed in position for use, to a greater extent without danger of breaking, than is possible with piston rings as generally constructed, thus providing a ring which is easily adjusted to fit any size piston without requiring more than ordinary skill.

It is a further object of the invention so to construct a piston ring that, freezing of the ring within the cylinder is eliminated.

It is a further object of the invention, so to construct a piston ring that it will present a continuous and uninterrupted working surface to the part with which it has working contact.

It is a further object of the invention to provide a piston ring which will not "freeze" at any operating temperature, within the cylinder in which it operates.

It is a further object of the invention to provide a piston ring, the joint of which is so constructed that even though the joints of several rings on one piston were to position themselves in line, leaking of compression through the aligned joint is impossible.

It is not uncommon in internal combustion engine pistons, for the ring grooves to become enlarged in a direction transversely of the groove. This condition is generally caused by a slapping of the hard metallic rings within the grooves. Such a condition permits the passage of gas around behind the ring, and a consequent loss of compression and consequently power, and it is a further object of the present invention so to construct a piston ring that it will at all times substantially fill the groove in which it is carried, thus preventing transverse enlargement of the groove by hammering due to movement of the rings in their grooves as the piston moves in the cylinder, and the loss of compression around the ring and consequent loss of power.

It is another object of the invention, so to construct a piston ring, that it will immediately upon placement within a cylinder, form a gas tight joint with the walls thereof without lapping in or other mechanical fitting as is invariably necessary with hard metallic rings.

With the above and other objects in view, the invention consists in the novel and improved construction, hereinafter described, and particularly pointed out in the claims, the advantages of which will be readily understood and appreciated by those persons skilled in the art to which this invention pertains.

The invention will be clearly understood from the accompanying drawing illustrating the invention, in a preferred form, and the following detailed description of the invention as therein shown.

In the drawing:

Figure 1 is a plan view of a piston ring constructed in accordance with the present invention, Figure 2 is an edge view thereof, Figure 3 is a detail edge view on an enlarged scale of a section of the piston ring, and;

Figure 4 is a detail sectional view showing the manner in which the ring fits into the ring groove of the piston, and also its engagement with the cylinder wall.

Referring to the drawing, the ring is designated A, and said ring comprises, when in operative position on a piston, a continuous circular band, the peripheral, or piston wall engaging edge of which is of sinuous form.

The ring is formed from metal, or other suitable material, and when finished has transverse and preferably uniform corrugations to form a body portion which is undulating in the direction of its circumference.

The transversely extending corrugations are designated 10, and they may be spaced at various distances dependent upon the size of the finished ring.

The metal employed in the manufacture of the ring may be of any desired type, except that it is highly desirable that it have a greater ratio of expansion under any given degree of heat than has the metal from which the piston and cylinder is formed with which it is used.

As illustrated at 12 in Figure 2, the corrugations at the ends of the strip from which the ring is formed, are shallower than the remaining corrugations, so that when the ends of the strip are brought together, and overlapped with the shallower corrugations of one end of the strip positioned within the shallower corrugations of the other end of the strip, all of the corrugations will occupy positions in the same plane, thus providing a ring which is of substantially the same thickness throughout its circumferential length.

By this construction, it will be obvious that when the strip is formed into a continuous ring the completed ring will be capable of expansion in two planes at substantially right angles to each other, that is to say, the ring will be expansible in a plane extending parallel with the axis of the ring as designated by the arrow B in Figure 2, and also in a plane extending radially of the ring as designated by the arrow C in said figure.

The space between the corrugations is filled with any suitable heat resisting packing material such as indicated at 15 in the drawing, and said material just fills said spaces, and preferably does not project beyond the tops or bottoms of the corrugations 10, but does, instead, terminate in a plane flush with the peaks of said corrugations 10.

This packing material has lubricating qualities and is of a compressible and expansible nature, and it expands and compresses as the ring expands and compresses thus insuring at all times, a gas tight working contact with the side walls of the cylinder, even when the cylinder varies from true round.

In Figure 4 a portion of a piston is illustrated at 16, and a portion of the cylinder at 17. The piston has a circumferentially extending groove 18, and the ring is mounted therein. As shown, the ring completely fills the transverse dimension of the groove 18, thus preventing hammering of the ring in the groove, and consequent enlarging of the transverse dimension of the groove as is the case when the ordinary hard piston rings are employed, since such rings cannot, on account of their hard metallic nature and relatively high co-efficient of expansion, be made to snugly fit the transverse dimension of a piston ring groove.

Thus it will be apparent that the present invention provides a piston ring which will at all times provide a gas tight joint between itself and the piston wall against which it operates, as well as with the several walls of the groove in which it is mounted. Furthermore, the invention provides a piston ring which will not hammer in its groove and thereby enlarge the groove and result in leaks around the ring. Still further, the invention provides a piston ring which may be fitted to pistons and cylinders within a wide range of sizes with equal effectiveness in each size.

While the invention is herein illustrated in a preferred form, it is to be understood that it is not to be limited to the exact construction shown, and that it may be practiced in other forms, without departing from the spirit thereof.

Having thus described the invention, what is claimed as new and what it is desired to secure by Letters Patent of the United States, is:

1. A piston ring comprising a substantially circular, transversely corrugated body portion, and a non-liquid anti-friction material substantially filling said corrugations.

2. A piston ring comprising a relatively thin and narrow transversely corrugated strip of metal bent into circular form with its ends overlapping each other and with corrugations adjacent one of the ends in interlocked relation with those of the opposite end.

JACOB G. ELKIN.